United States Patent [19]

Ahmed et al.

[11] Patent Number: 5,140,235
[45] Date of Patent: * Aug. 18, 1992

[54] POWER SEAT, IMPROVED SWITCH SYSTEM THEREFOR

[75] Inventors: Moin Ahmed, Madison Heights; Joseph J. Umpirowicz, Northville, both of Mich.

[73] Assignee: Chrysler Corporation, Highland Park, Mich.

[*] Notice: The portion of the term of this patent subsequent to Aug. 6, 2008 has been disclaimed.

[21] Appl. No.: 520,920

[22] Filed: May 9, 1990

[51] Int. Cl.⁵ .......................... H02P 1/22; H01H 9/00
[52] U.S. Cl. .................. 318/286; 200/5 R; 318/264; 318/266; 318/468
[58] Field of Search .............. 200/5 R, 1 V, 6 R, 6 A, 200/339, 556, 557; 307/10.1–10.8, 112; 318/466, 280, 286, 264, 266, 468; 297/330

[56] References Cited

U.S. PATENT DOCUMENTS

| | | | |
|---|---|---|---|
| 3,597,554 | 8/1971 | Siegal | 200/52 R |
| 4,000,383 | 12/1976 | Lockard | 200/16 D |
| 4,002,874 | 1/1977 | Brown | 200/556 X |
| 4,221,941 | 9/1980 | Genovese | 200/339 X |
| 4,454,390 | 6/1984 | Gmeiner et al. | 200/6 A |
| 4,533,803 | 8/1985 | Beller et al. | 200/339 X |
| 4,809,180 | 2/1989 | Saitoh | 318/466 X |
| 5,038,086 | 8/1991 | Ahmed et al. | 318/286 |

Primary Examiner—J. R. Scott
Attorney, Agent, or Firm—Wendell K. Fredericks

[57] ABSTRACT

Operation of eight motors to control two power seats of a vehicle is effected by four rocker switches and a seat select switch. Each seat can be moved in eight different directions.

3 Claims, 3 Drawing Sheets

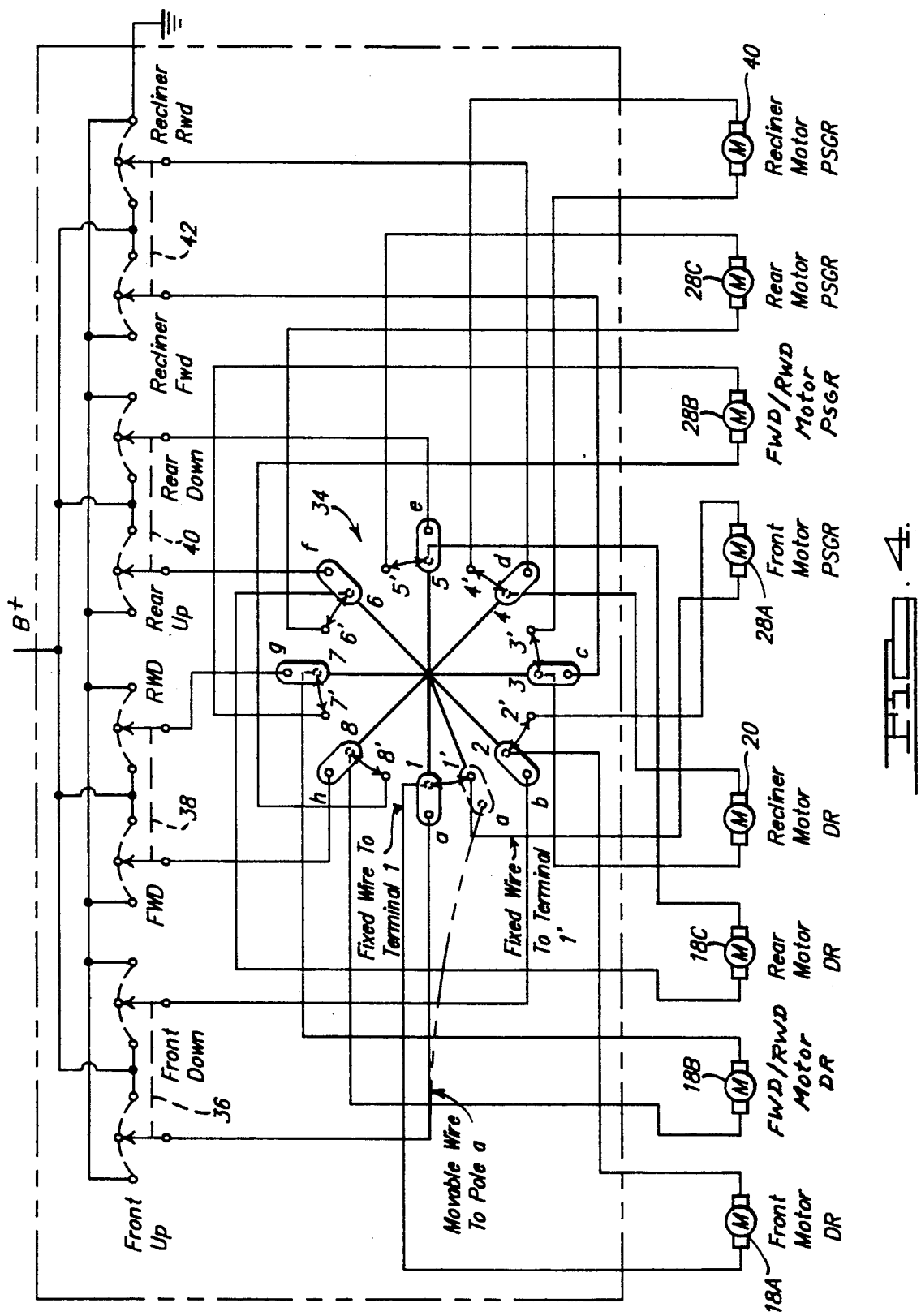

POWER SEAT, IMPROVED SWITCH SYSTEM THEREFOR

FIELD OF THE INVENTION

The present invention relates generally to novel switch systems for controlling power seats, and particularly to switch systems employing a rotary switch in conjunction with a minimum number of rocker-type switches to control a plurality of motors and power-seat adjustments.

BACKGROUND OF THE INVENTION

Conventional power-seat systems provide for adjusting the driver and passenger seat to a variety of positions.

One common arrangement permits adjusting these seats in six different directions. Three reversible motors operate each power seat. Different motors operate to control movement of the front and the back of each seat, e.g, independently raising and lowering the front or rear of each seat.

A pair of control switch assemblies for this arrangement, located on the lower outboard side of the driver and passenger seats, controls the operation of the seat motors. A front rocker-type switch in each assembly raises or lowers (tilts) the front of the seat. A middle 4-way "joy-stick" type lever in the assembly raises or lowers the complete seat by moving the lever up or down. The middle lever also moves the complete seat forward or rearward by moving the lever forward or rearward. A rear rocker-type switch in the assembly raises or lowers the back of the seat.

Such an arrangement requires individual switch assemblies for each seat. Within the assembly, a separate switch controls an individual motor. Hence, six switches and six motors provide means for controlling driver and passenger seat movement in six different directions.

U.S. Pat. No. 5,038,086 of the present inventor, filed on even date, teaches an improved switch system that employs a rotary switch to select the driver or passenger power seat and then provides individual switches and a "joystick" to control movement of the selected seat in 10 different directions.

Hence, to add movement of the seat in other directions, such as reclining the back seat, would require additional motors, wires and switches and motion control gearing to effect the movement.

In an effort to minimize the need for additional components to achieve additional power-seat orientations, a search was initiated to find other schemes for powerseat control. That search ended in the improved powerseat switch control presented in the instant invention.

SUMMARY OF THE INVENTION

The present invention is concerned with an improved switch system for controlling the operation of power-seat motors. A two-position rotary switch permits coupling input and output terminals of all the motors associated with a driver and a passenger power seat and the selection of the terminals of the motors associated with either the driver seat or the passenger seat. Once the seat is selected, front tilt, rear tilt, recline and forward and backward horizontal movement of the selected seat can be effected by pressing appropriately chosen rocker type switches.

IN THE DRAWINGS

FIG. 4 depicts, in schematic form, the powerseat switch control system of the present invention that includes a rotary select switch.

DETAILED DESCRIPTION OF A PREFERRED EMBODIMENT

Figure 1:
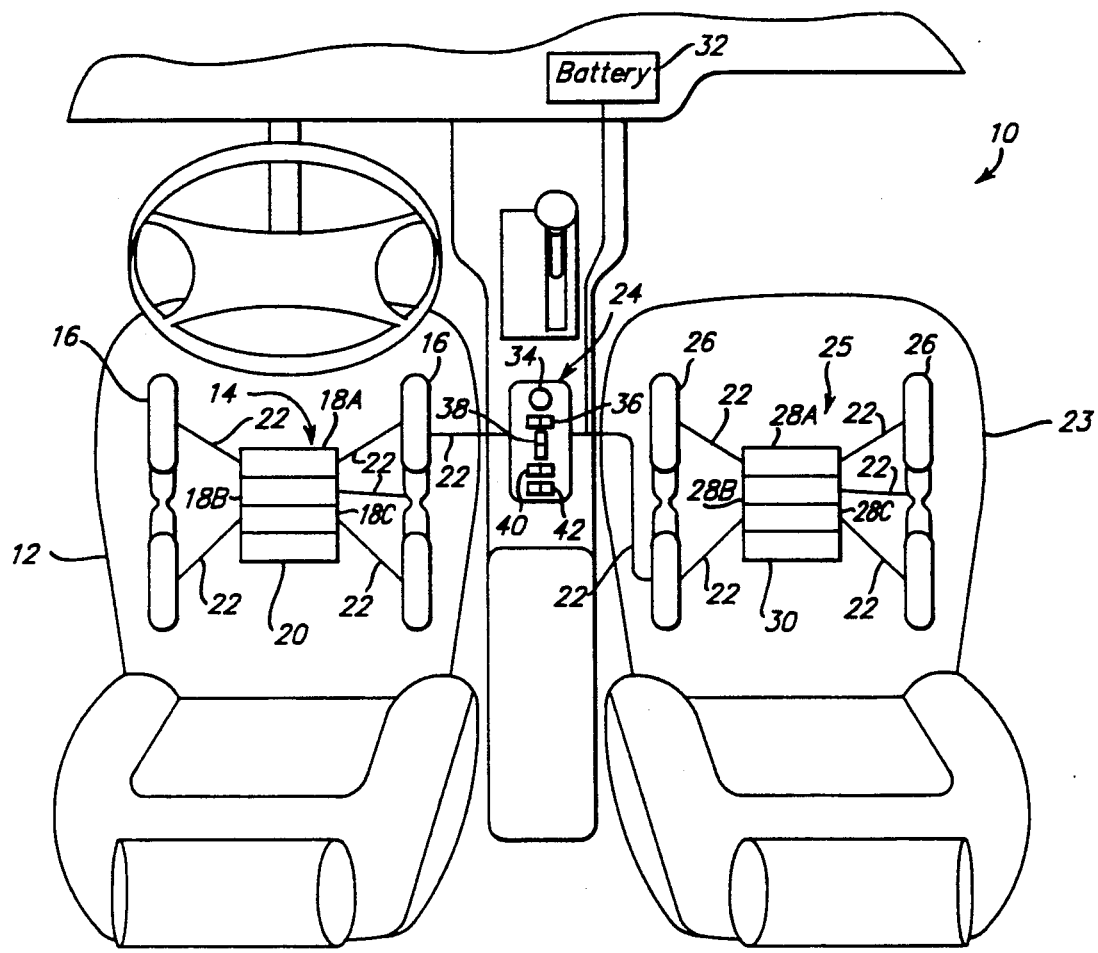
FIG. 1 illustrates a cutaway top view of a driver and passenger power-seat switch control system of the present invention.

With reference to FIG. 1, this figure depicts a cutaway, top view of the interior of the front seats of a vehicle containing a rotary switch power-seat assembly 10 of this invention.

Within driver seat 12 mounts motor-power means 14 comprised of conventional transmission-type, power-seat adjuster assemblies 16—16 mounted in the seat tracks; three power-seat motors 18A, 18B and 18C and a power recliner motor 20 with connecting cables 22 linking the motors to the seat adjusters 16—16 and to a centrally located control switch assembly 24.

Likewise, within passenger seat 23 mounts motor-power means 25 comprised of conventional transmission type, power-seat adjuster assemblies 26—26 mounted in the seat tracks; three power-seat motors 28A, 28B and 28C and a power recliner motor 30 with a plurality of cables 22 linking the motors to the seat adjusters 26—26 and to the centrally located control switch assembly 24.

Power to both motor power means come from the vehicle battery 32.

Rather than having individual control switch assemblies for each seat, the centrally located control switch assembly 24 serves as control for the driver and passenger power seats 12 and 23 respectively.

Figure 2:
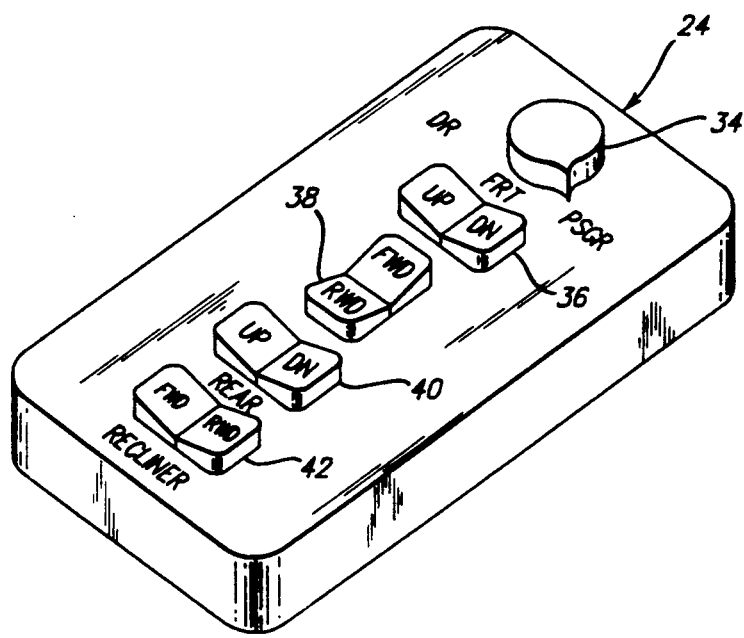
FIG. 2 depicts an exploded view of a control switch assembly of the switch control system of FIG. 1.

FIG. 2 depicts an exploded view of the control switch assembly 24. Switch assembly 24 includes a double throw, eight pole rotary switch 34, four rocker switches comprised of double-pole, double-throw switch mounted in a single rocker switch housing; namely, switches 36 (FRONT), 38 (HORIZONTAL) 40 (REAR) and 42 (RECLINER). The rocker switches return to a neutral position, as shown in FIG. 3, upon release.

The rotary switch is a series 600 switch manufactured by Electroswitch Corporation of Raleigh, North Carolina; the rocker switches are manufactured by Molveno Cometti SPA of Milano Italy.

Figure 3:
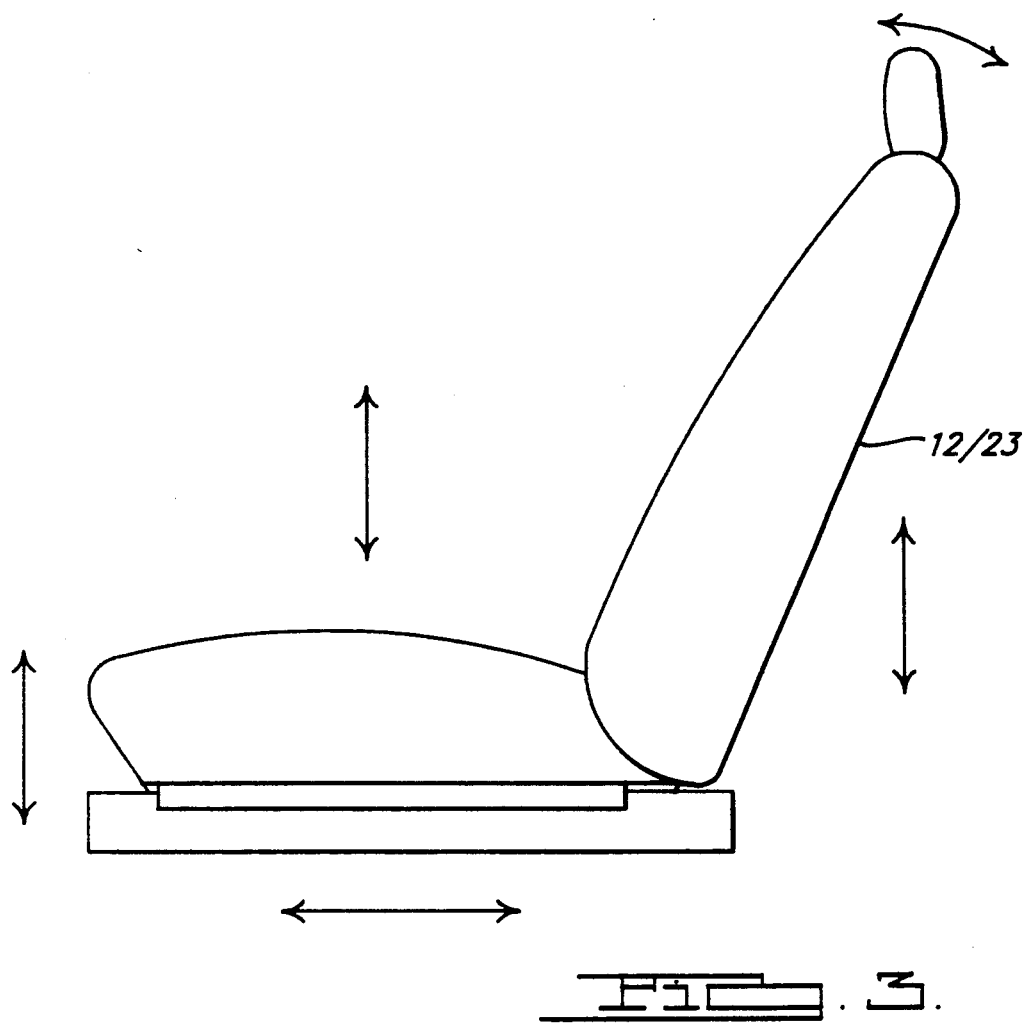
FIG. 3 illustrates, in a side view of the front seats, the plurality of directions the seats can be moved using the switch control assembly of FIG. 2.

As illustrated in side view of seats 12 and 23 of FIG. 3, this arrangement allows for dual use of rocker switches for adjusting the driver and passenger seats to eight different directions: forward, backward, tilt front end (up and down), tilt rear end (up and down) incline forward and incline backward.

Figure 5:
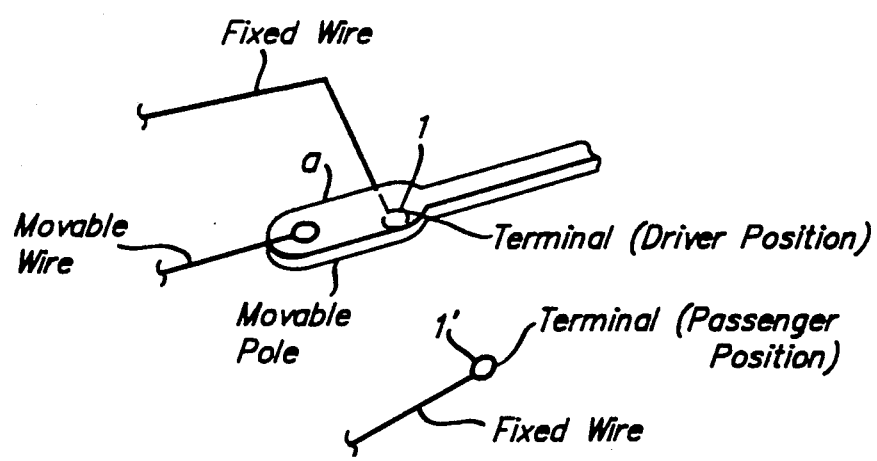
FIG. 5 depicts the relationship of a pole of the rotary switch and the two terminals and wires associated with the terminal.

Rotary switch 34, best illustrated schematically in FIG. 4, has two positions; namely, a driver (numbered terminals position 1-8) and a passenger (prime number terminal $1^1$-$8^1$) position. Wires routing to the numbered and prime numbered terminals are fixed and do not move while the wires routing to the lettered poles (a–h) move with the pole between the driver and passenger positions. FIG. 5 depicts a movable pole a with a wire fixedly attached that moves with pole-a when the pole moves between terminal 1 and terminal $1^1$.

The power-seat motors 18 A, 18B and 18C and 28A, 28B, and 28C the power recliner motors 20 and 30 are permanent magnet reversible motors protected by 30 amp circuit breakers (not shown).

OPERATION OF THE SYSTEM

With reference to FIG. 4 and Table 1, an explanation of the operation of the power seats follows.

TABLE 1

| Seat | Rotary Sw | Hor SW 38 Fwd | Hor SW 38 Rwd | Frt SW 36 Up | Frt SW 36 Dn | Rear SW 40 Up | Rear SW 40 Dn | Recline SW 42 Fwd | Recline SW 42 Rwd | Active Mtr |
|---|---|---|---|---|---|---|---|---|---|---|
| Dr Frt Up | a-1 2-b | G | G | P | G | G | G | G | G | 18A |
| Dr Frt Dn | 1-a b-2 | G | G | G | P | G | G | G | G | 18A |
| Psgr Frt Up | a-1' 2'-b | G | G | P | G | G | G | G | G | 28A |
| Psgr Frt Dn | 1'-a b-2' | G | G | G | P | G | G | G | G | 28A |
| Dr Rear Up | f-6 5-e | G | G | G | G | P | G | G | G | 18C |
| Dr Rear Dn | 6-f e-5 | G | G | G | G | G | P | G | G | 18C |
| Psgr Rear Up | f-6' 5'-e | G | G | G | G | P | G | G | G | 28C |
| Psgr Rear Dn | 6'-f e-5' | G | G | G | G | G | P | G | G | 28C |
| Dr Fwd | h-8 7-g | P | G | G | G | G | G | G | G | 18B |
| Dr Rwd | 9-7 8-h | G | P | G | G | G | G | G | G | 18B |
| Psgr Fwd | h-8' 7'-g | P | G | G | G | G | G | G | G | 28B |
| Psgr Rwd | g-7' 8'-h | G | P | G | G | G | G | G | G | 28B |
| Dr Recline Fwd | c-3 4-a | G | G | G | G | G | G | P | G | 20 |
| Dr Recline Rwd | d-4 3-c | G | G | G | G | G | G | G | P | 20 |
| Psgr Recl Fwd | c-3' 4'-a | G | G | G | G | G | G | P | G | 40 |
| Psgr Recl Rwd | d-4' 3'-c | G | G | G | G | G | G | G | P | 40 |

TABLE 1

In Table 1, the "P" indicates pressing of the switch and the "G" indicates that the circuit associated with that part of the switch is grounded. The letters and number under the heading "Rotary SW" designate the pole and terminals respectively of the rotary switch 34 that are employed for the movement described under the heading "seat". System 10 receives operating power (+B and ground) from battery 32 of FIG. 1.

To tilt the front of the driver seat UP, rotary switch 34, a two position switch; namely, the driver position (DR) and the passenger position (PSGR), as indicated in Table 1 and shown in FIG. 4, must be rotated to the driver position and then FRONT switch 36 must be pressed and held in the UP position until the desired tilt upward of the front of the driver seat is achieved. None of the other switches require movement.

Power routes through the pressed SW36 and the selected poles and terminals of the rotary switch to the associated motor. The seat adjusters associated with each motor contains structure which limits movement of the seats along the seat tracks.

To tilt the front of the driver seat down, rotary switch 34 must be used to select the driver position, then FRONT switch 36 must be pressed and held in the DN position until the desired downward tilt of the front of the driver seat is achieved.

Likewise, the passenger seat may be tilted in the same manner, but the rotary switch 34 must be rotated to the passenger position before pressing the same rocker switch 36 to achieve the same desired results for that seat.

To tilt up or down the rear of the driver or passenger seat, the rotary switch 34 must be used to select either DR or PSGR, then switch 40 must be appropriately pressed.

To affect reclining the rear of either seat, again rotary switch 34 must be used to select which seat to recline and then switch 42 must be appropriately pressed to cause recline movement in the forward or rearward directions.

To move the seat forward or backward, again the rotary switch 34 must be used to select which seat is to be moved and then rocker switch 38 must be pressed to effect forward or backward movement of the seat.

What is claimed is:

1. A power-seat switch control system for controlling movement in a plurality of directions and seat positions of a driver and a passenger front seat for a vehicle, the driver and passenger seats having a plurality of motors positioned under the seats, and connected to receive power from a power source and mated to transmission-type adjusters for affecting movement to and from the plurality of seat positions, said switch control system permitting independent movement of both the driver and passenger seats to each of the plurality of seat positions in accordance to the desires of an operator, said system comprising:

a) a selection switch means for selecting which seat to move and associated front, FWD/RWD, rear and recliner motors used, said selection switch means having terminals for making available an individual input and an output terminal of each one of the plurality of motors associated with the selected seat;

b) first switch means connected between the power source and said selection switch means for providing either direct or reverse source power to the motor associated with tilting a front edge of the selected seat;

c) second switch means connected between the power source and said selection switch means for providing either direct or reverse source power to the motor associated with tilting a rear edge of the selected seat;

d) third switch means connected between the power source and said selection switch means for providing either direct or reverse source power to the motor associated with reclining a back portion of the selected seat forward or rearward; and e) a fourth switch means connected between the power source and said selection switch means for providing direct or reverse source power to motors associated with moving the selected seat in a horizontal plane.

2. Apparatus in accordance with claim 1 wherein said selection switch means is a double throw, eight pole type rotary switch having eight poles connected to terminals of said first, second, third and fourth switch means, and sixteen terminals connected to terminals of the plurality of motors associated with moving the driver and passenger seats.

3. Apparatus in accordance with claim 2 wherein said first, second, third and fourth switch means are rocker switches each of which being composed of a double-pole, double throw switch arrangement, wherein the pressing of one side of the rocker controls connecting the power source to a motor while the circuits associated with the unpressed side of the switch connected to ground, the rocker returning to a neutral position after being released.

* * * * *